US012304101B2

(12) United States Patent
Subbiah et al.

(10) Patent No.: US 12,304,101 B2
(45) Date of Patent: May 20, 2025

(54) HOTWIRE CUTTING MACHINE

(71) Applicants: INDIAN INSTITUTE OF TECHNOLOGY MADRAS, Chennai (IN); SVP LASER TECHNOLOGIES PVT. LTD., Chennai (IN)

(72) Inventors: Sathyan Subbiah, Chennai (IN); Viswesh Srinivasan, Chennai (IN); M. Venkateshwaran, Chennai (IN)

(73) Assignees: INDIAN INSTITUTE OF TECHNOLOGY MADRAS, Chennai (IN); SVP LASER TECHNOLOGIES PTE. LTD., Chennai (IN)

( * ) Notice: Subject to any disclaimer, the term of this patent is extended or adjusted under 35 U.S.C. 154(b) by 363 days.

(21) Appl. No.: 17/606,668

(22) PCT Filed: Apr. 28, 2020

(86) PCT No.: PCT/IN2020/050387
§ 371 (c)(1),
(2) Date: Oct. 26, 2021

(87) PCT Pub. No.: WO2020/222253
PCT Pub. Date: Nov. 5, 2020

(65) Prior Publication Data

US 2022/0203568 A1 Jun. 30, 2022

(30) Foreign Application Priority Data

Apr. 29, 2019 (IN) ............................. 201941016991
Jun. 10, 2019 (IN) ............................. 201941023008

(51) Int. Cl.
*B26D 1/553* (2006.01)
*B26D 1/30* (2006.01)
(Continued)

(52) U.S. Cl.
CPC ............... *B26D 1/553* (2013.01); *B26D 1/30* (2013.01); *B26D 3/006* (2013.01); *B26D 5/005* (2013.01); *B26D 7/2628* (2013.01); *B26F 3/12* (2013.01)

(58) Field of Classification Search
CPC ................. B26F 3/06; B26F 3/08; B26F 3/12
(Continued)

(56) References Cited

U.S. PATENT DOCUMENTS 3,333,494 A * 8/1967 Smith .................... B26D 3/006
83/171
3,786,701 A * 1/1974 Ludwig .................. B26D 3/006
83/651.1
(Continued)

*Primary Examiner* — Adam J Eiseman
*Assistant Examiner* — Richard D Crosby, Jr.

(57) ABSTRACT

The hotwire cutting machine (700) comprises a plurality of heated wires (701), springs (702, 702*a*), and grooved rods (703, 703*a*, and 1203) supported on end bearings (402, 403). The grooved rods (703, 703*a*, and 1203) are coupled to a motor (504) for rotating the grooved rods (703, 703*a*, and 1203) in the direction of wire movement due to thermal expansion. The wires are oscillated along their length by the to-and-fro rotation of a splined shaft (704, 1204). Existing solutions oscillate the entire heavy frame, resulting in vibrations and requiring heavy motors and drives. In contrast, the proposed hotwire cutting machine (700) minimizes the oscillating mass and allows for automatic adjustment of inter-wire distance/pitch. The composite cutting wire section includes a first wire (1209) with high mechanical strength and low electrical resistance, joined by manual twisting or welding with a second wire (1201), typically Nichrome, to withstand repeated bending cycles.

9 Claims, 8 Drawing Sheets

(51) Int. Cl.

| | |
|---|---|
| ***B26D 3/00*** | (2006.01) |
| ***B26D 5/00*** | (2006.01) |
| ***B26D 7/26*** | (2006.01) |
| ***B26F 3/12*** | (2006.01) |

(58) Field of Classification Search
USPC .................................................. 83/651.1, 171
See application file for complete search history.

(56) References Cited

U.S. PATENT DOCUMENTS 4,111,085 A * 9/1978 Johnson .................. B26D 3/10 83/811
4,601,224 A * 7/1986 Clark, III ................. B26D 5/00 83/171
4,683,791 A * 8/1987 Demont .............. B29C 44/5654 83/16
4,903,682 A * 2/1990 Kurokawa ......... B23D 57/0061 125/21
4,915,000 A * 4/1990 MacFarlane ....... B23D 57/0061 125/21
5,573,350 A * 11/1996 Stegall .................... E03F 3/046 404/4
5,918,517 A * 7/1999 Malapert ............... B26F 1/3806 83/171
6,125,733 A * 10/2000 Hwang .................. B26D 1/547 83/788
6,386,083 B1 * 5/2002 Hwang ................. B26F 1/3833 83/788
6,832,538 B1 * 12/2004 Hwang ................. B26F 1/3833 83/788
10,464,229 B2 * 11/2019 Gonzalez Bohme .. B26D 5/086
10,882,126 B2 * 1/2021 Hungerford, Jr. ..... B23D 53/08
2011/0314984 A1 * 12/2011 Stege ..................... G05B 19/19 83/13
2018/0050460 A1 * 2/2018 Gonzalez Bohme .. B26D 3/006
2018/0186026 A1 * 7/2018 Annequin ................. B26F 3/12

* cited by examiner

HOTWIRE CUTTING MACHINE

TECHNICAL FIELD

This application is claims the benefit of a foreign priority application filed in India as Serial No. 2019 41023008 on Jun. 10, 2019, and Serial No. 2019 41016991 on Apr. 29, 2019 all of which are incorporated by reference. This invention is related to foam cutting machines using heated wire and auto String pitch adjustment for multi wire cutting machine.

BACKGROUND OF THE INVENTION

In hotwire machine, the cutting wire often breaks during power/heat on, as it rubs on a static grooved rod. Also tension in the wire drops due to thermal expansion, which is not sufficiently adjusted by the springs, because of high friction force between the rod and the wire.

Hence there is a need to develop a more efficient design which minimizes rubbing and wire breakage and also maintains sufficient tension ALL the time. Often it required to adjust string pitch in multiple string hot wire machine. It is also necessary to oscillate/move the wire to and fro in a ‘sawing’ action (along its length) to increase the cutting speed.

OBJECT OF THE INVENTION

The principal objective of this invention is to develop a mechanism which will avoid rubbing of wires on the grooved rod, thus increasing wire life and string adjustment for multi wire machine.

Another objective is to maintain sufficient tension in the cutting wire ALL the time, even when the wire is heated.

Another objective of the invention is to develop an efficient method of oscillating the multiple cutting wires along its length, the same design should also allow easy automatic string pitch adjustment.

These and other objects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
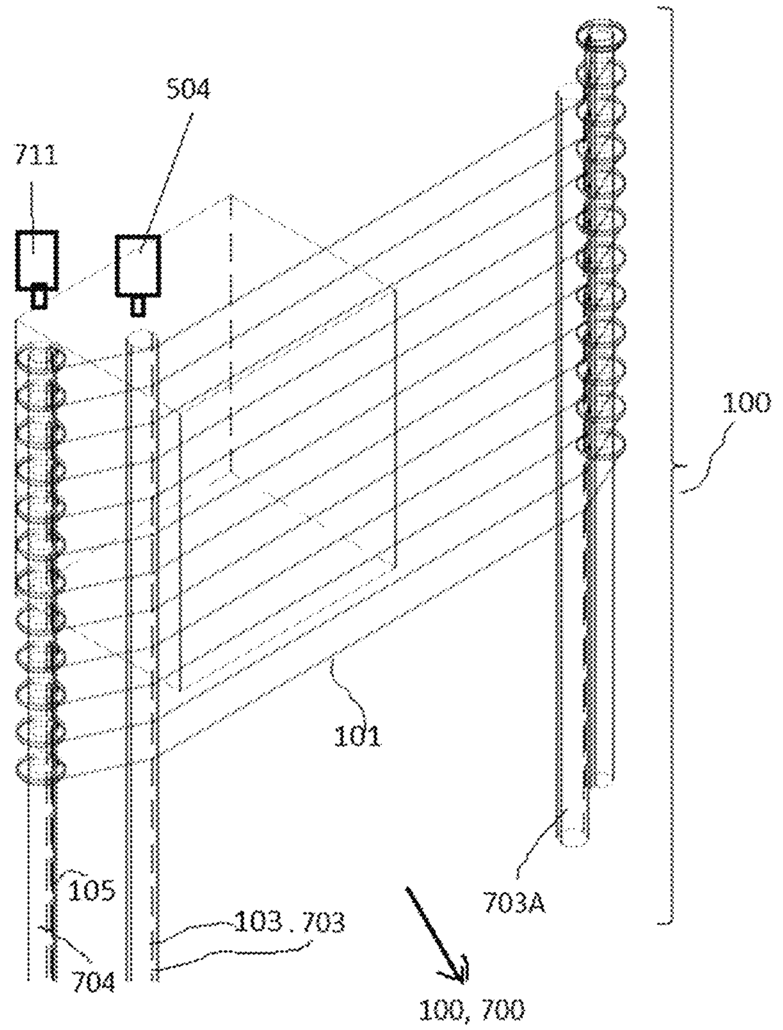
FIG. 1 depicts a typical hotwire cutting setup.
Figure 1:
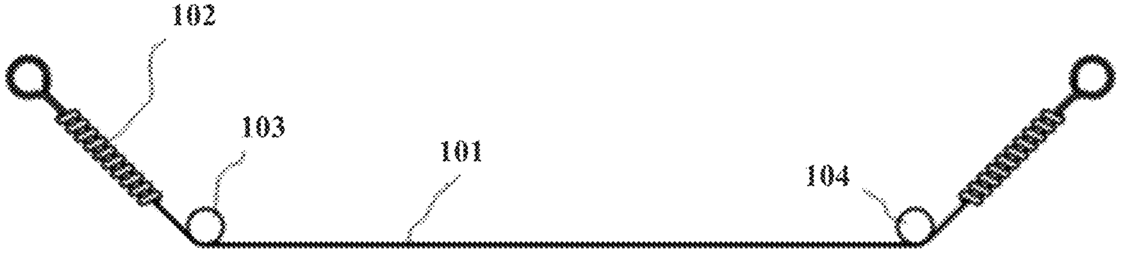

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. For example, it should be noted that while some embodiments are explained with respect to cutting of foam with heated wire, any other application like material, tool, may also incorporate the subject matter of the invention with little or no modifications. Accordingly, the examples should not be construed as limiting the scope of the embodiments herein.

The embodiments herein describe an improved hot wire cutting machine for foam cutting applications. Referring now to the drawings, and more particularly to FIG. 1-4, where similar reference characters denote corresponding features consistently throughout the figures, there are shown embodiments.

FIG. 1 shows a typical hotwire setup 100 with heating element wire 101, held by springs 102 on one side or both sides of the wire.

103, 104 are typically support rods with groove or teeth, in which the wire 101 sits stably.

Power supply is connected between 103 & 104 rods.

When current flows through the wire 101, it expands because of thermal expansion.

T1 is the tension in the wire between the spring 102 & rod 103.

T2 is the tension in the wire between the rods 103 & 104. T2 is typically 3-5 Kg force.

F is the contact force between the wire 101 and rod 103.

It is desirable to have a high contact force F between the string and rod, to ensure good electrical conductivity to ensure smooth flow of current. But high contact force F increases the friction force Ff between the wire and the rod.

When current flows through wire 101, it expands due to thermal expansion.

The spring is supposed to un-stretch and pulls the wire back, so that sufficient tension is maintained in the wire.

Thus, there is sliding contact between the wire and the rod, which can eventually cause the wire to break. Also, T2=T1−Ff. Hence effective tension in the cutting wire T2 is less.

Figure 2:
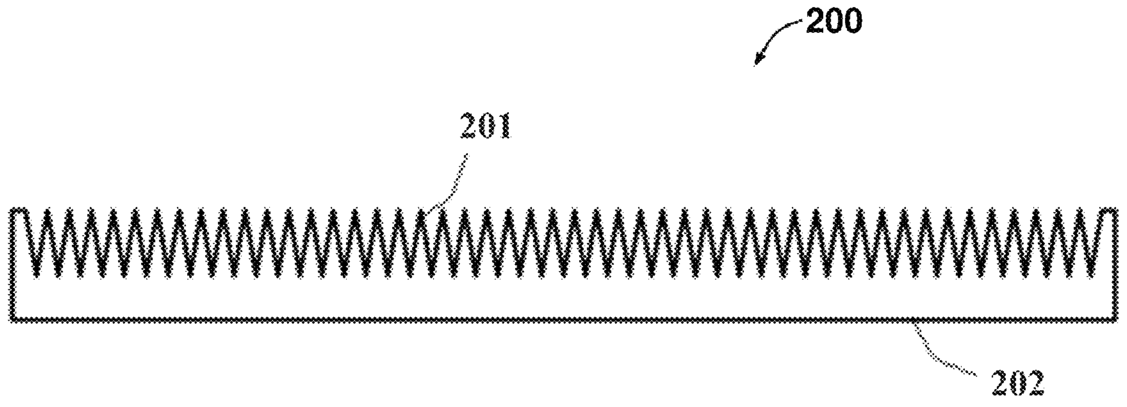
FIG. 2 depicts a typical toothed rack rod, used to power the wires.
Figure 3:
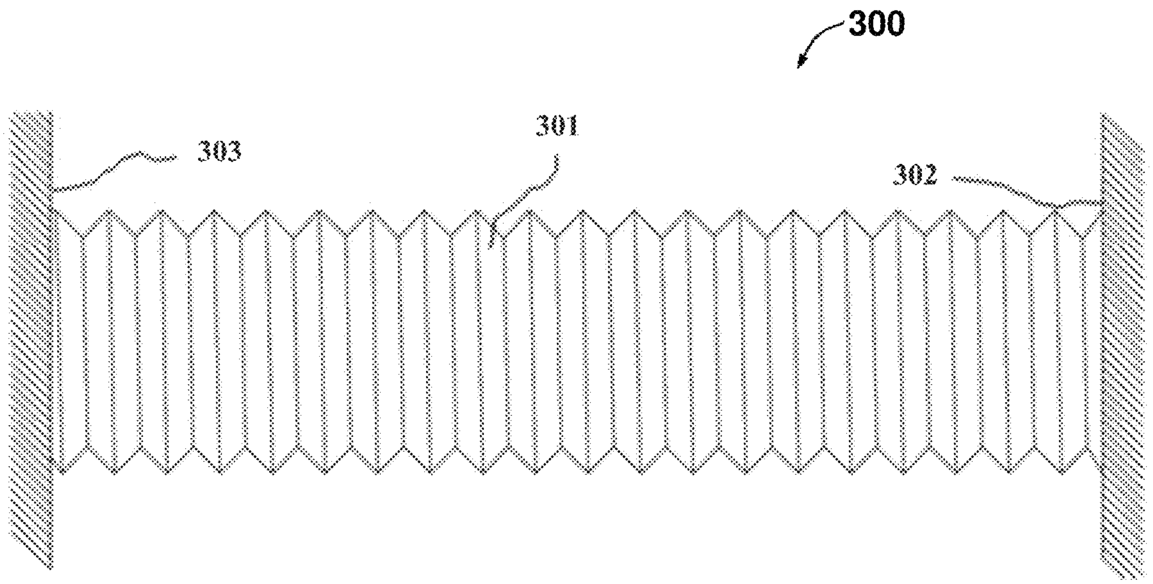
FIG. 3 depicts a typical threaded rod, used to power the wires.

This also means, we need to maintain a high value of T1, in order to achieve a high T2. But due to the nature of NiCr wire used, it has a low yield point and hence, maintaining high tension is not always feasible. In existing machines, a fixed rack plate with teeth is typically used as shown in FIG. 2.

In some other existing machines, a circular threaded rod 301, fixed at ends 302 & 303 is typically used.

In both above methods, there is sliding contact between wire and rod, which affects wire life and effective tension in the heated cutting wire.

Figure 4:
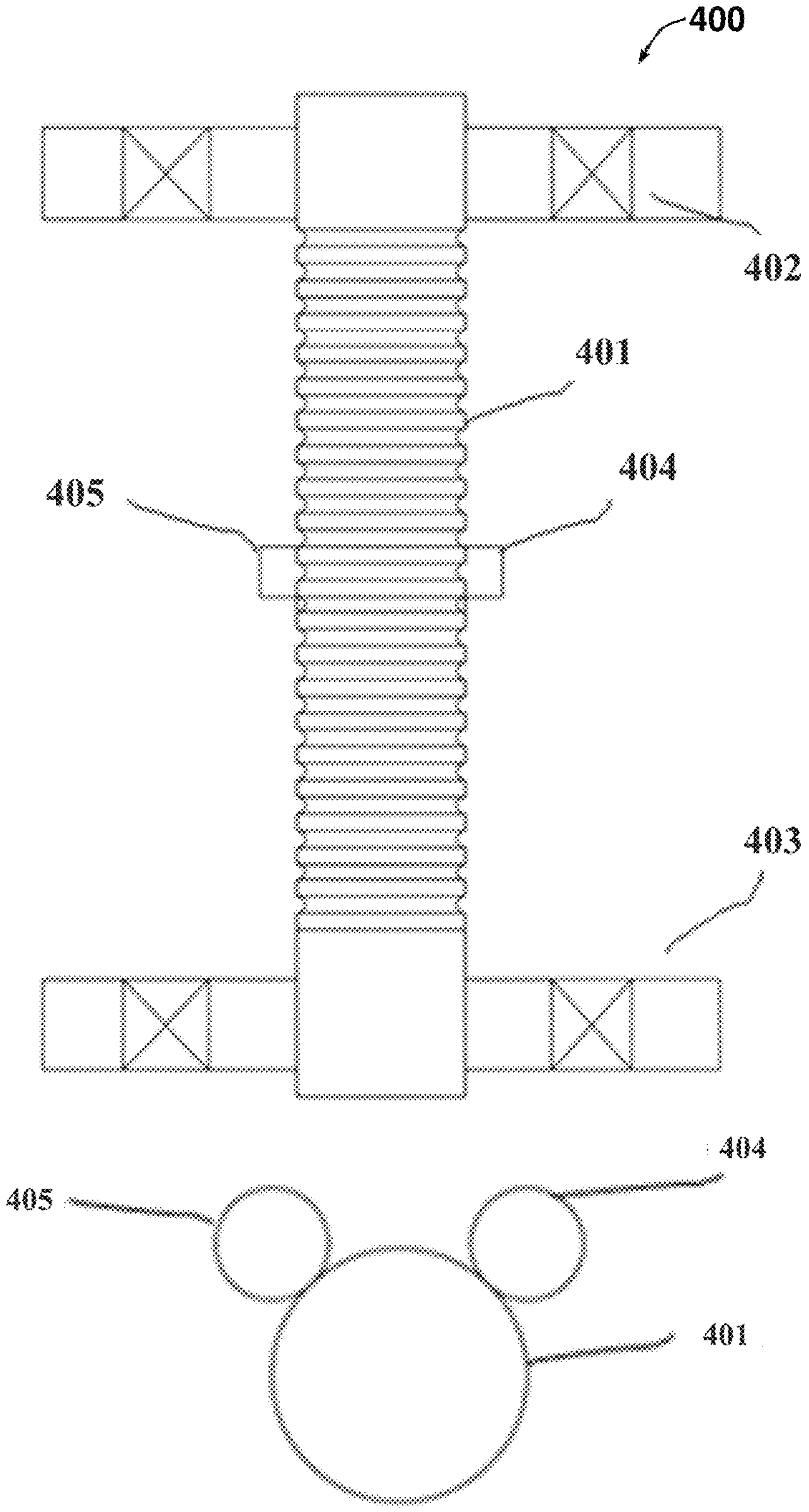
FIG. 4 depicts the proposed design with threaded rod supported by bearings.

A novel method of supporting the teethed/grooved rod 401 on bearings 402 & 403, is proposed in this invention as shown in FIG. 4.

The rod is also supported along its length by one or more bearings 404, 405 etc. as shown in FIG. 4.

Such an arrangement improves wire life by avoiding rubbing of wire on the rod support. It also enables to maintain higher wire tension T2, because now we have rolling friction, so Ff is almost zero.

This also allows us to maintain a higher contact force F, between wire and the rod, thus ensuring good electrical conductivity.

In one embodiment, it is proposed to have periodic grooves on the rod, instead of a helical thread. This prevents small up/down movement of the wire, (sitting on the helical thread), because of rod rotation. (Helix angle zero).

There is a possibility of impurities settling in the grooves of the rod 401. These impurities may come between the cutting wire and the rod, affecting electrical conductivity.

It is proposed to give an option to pass current through the spring and then to the string initially. Once the wire is hot, it will melt any solidified plastics in the groove and make contact with rod 103.

In another embodiment it is proposed to optionally have a scrubber device, to remove impurities from the grooves of the rod.

The scrubbing mechanism can be a simple hollow shaft motor, with matching thread on the ID of the motor shaft, and scrubbing metallic brushes.

But since pitch of the thread is very fine, this can be a slow process.

In another embodiment, a linear axis parallel to the rod, carries a scrubbing brush and scrubs the grooves, to eliminate impurities.

An optional IR camera can check if all the wires are heating up and warn the operator, if any of the wire is not heating or cut.

Above invention is also applicable for single wire cutting machine, with a shorter rod and bearing on only one side.

Above invention also applicable for manual or semi-automatic foam cutting machine by heated wire.

It is also proposed to use a grooved rod of sufficiently large diameter, such that even small force imbalance will cause the rod to rotate, overcoming static friction in the bearings and because of the power cable connected to the grooved rod, which may provide some hindrance to free rotation.

Figure 5:
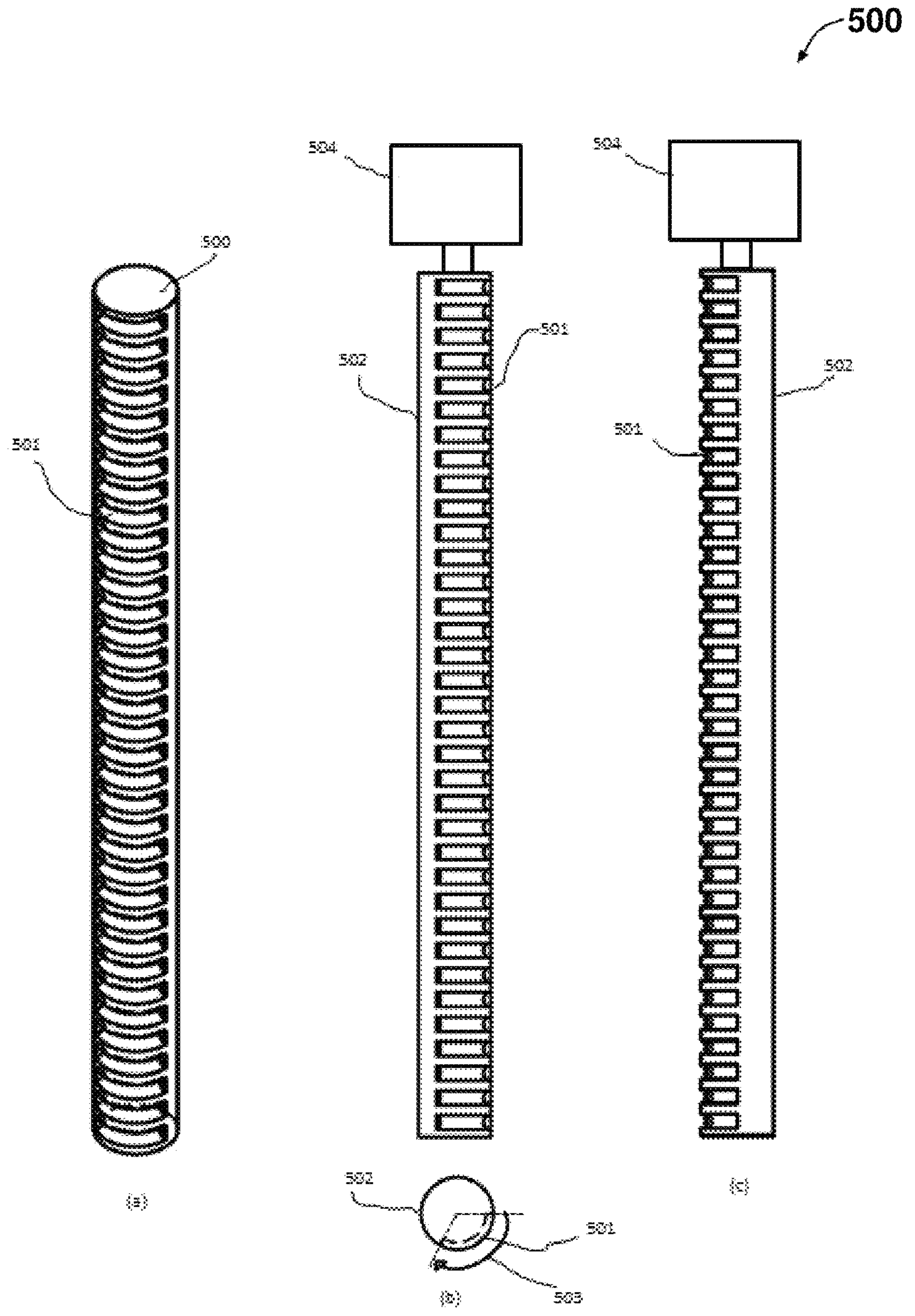
FIG. 5 depicts the proposed semi grooved rod with different projection views which will be supported by bearings and a electrical motor.
Figure 6:
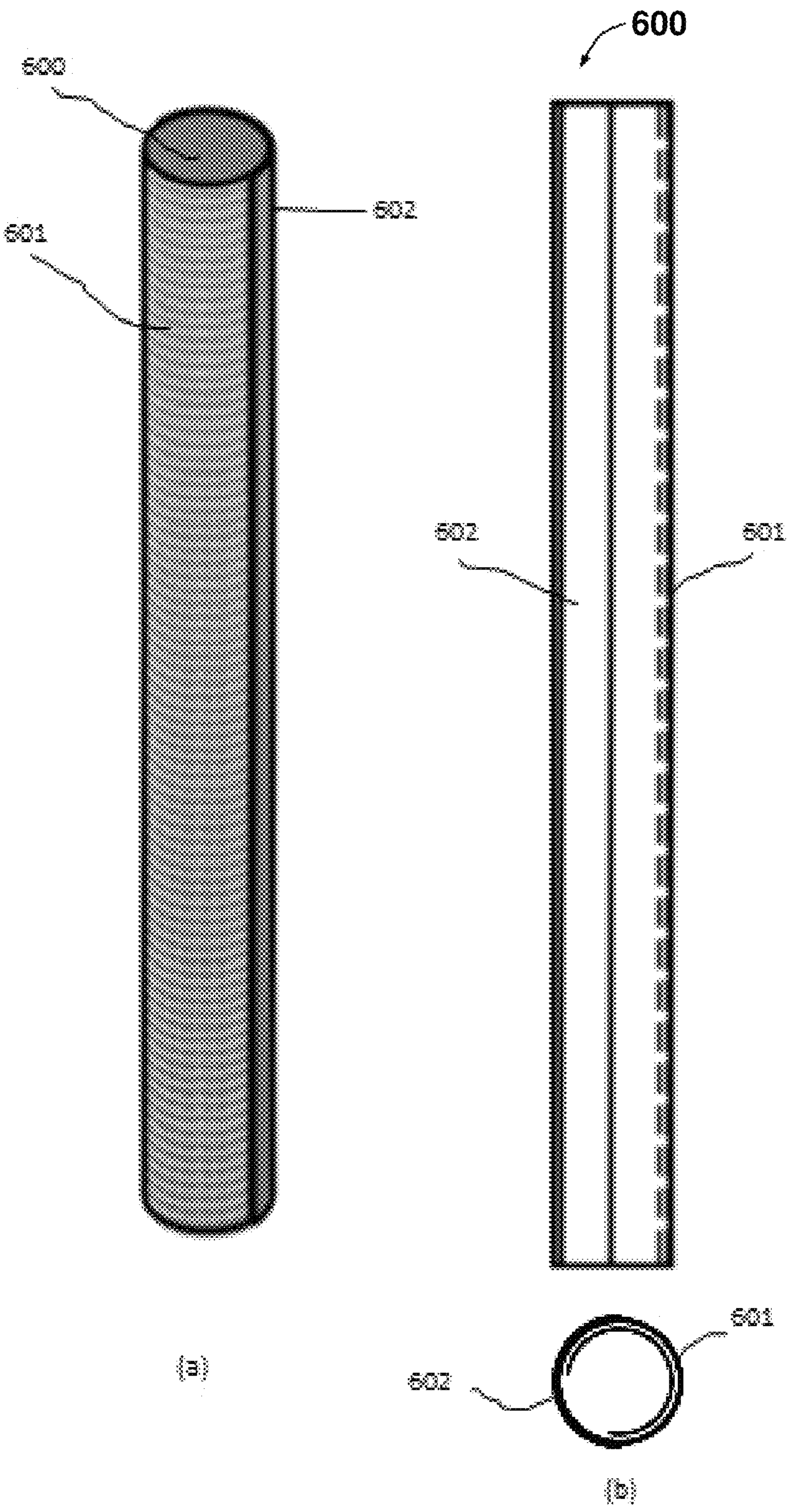
FIG. 6 depicts the proposed threaded rod with metal sheet cladded on to it.

In one embodiment of the invention: the grooved rod 500 is grooved only on one face 501 of the rod (~90-180 deg is grooved). The other part/face 502 (remaining ~180-270 deg) is plain without grooves, as shown in FIG. 5. Normally the heating wires will be sitting in the grooves, to prevent it from shifting. But, when Automatic string pitch adjustment needs to happen, the heating wires should not be sitting in the groove. To achieve this objective of moving the wire out of the grooves, it is proposed to rotate the rod 500 by around 180 deg with respect to rod center with the help of the motor 504, such that the wires will now be sitting on the plain face of the rod. In this condition, it is easy to do "Automatic string pitch adjustment". To achieve this, grooves can be cut on only one face of the rod.

Alternately a sheet of brass 601 or any other good conducting material can be wrapped/clad on to one face of the grooved rod which we intend to be plain. The clad sheet 601 can be bolted or brazed/welded to the grooved rod after wrapping to achieve a plain face.

To achieve rotation of the rod, it is coupled to a motor with minimal detent torque. After the string adjustment, the motor is disabled, thus allowing the grooved rod 500 on bearings to self-adjust freely based on wire tension variations because of thermal expansion as explained before.

In another embodiment, the motor 504 can optionally help the grooved rod 401 to rotate, exactly when heat is turned On to the wire, too overcome static friction on the bearings.

In one embodiment, the rod position is maintained such that the plain face of the rod is engaged with the wires when heat is being turned on. After heat is turned on, the rod is rotated by 180 deg to engage the strings to the groove.

As mentioned earlier, often it required to adjust string pitch in multiple string hot wire machine. It is also necessary to oscillate/move the wire to and fro in a 'sawing' action (along its length) to increase the cutting speed.

Figure 7:
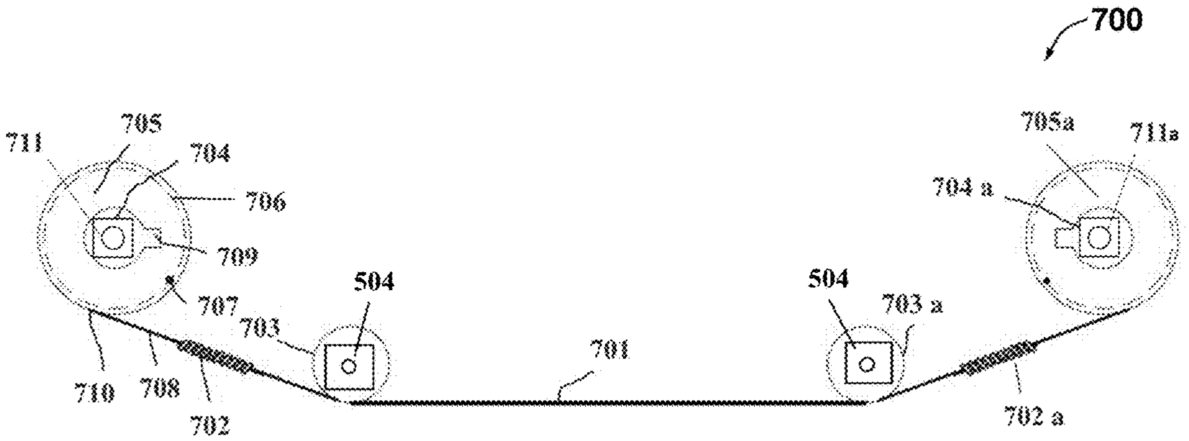
FIG. 7 shows a system for adjusting both string pitch adjustment, as well as wire oscillation.

FIG. 7 shows a system for adjusting both string pitch adjustment, as well as wire oscillation.

701 is the heating element (NiCr wire typical).

702 is the spring providing tension, 703 is the threaded/grooved rod.

704 is a rigid rod, with one or more keyway 709.

705 is a circular disc, with matching keyway slot to lock to key 709, but free to slide along length of the rod 704.

The disc 705 has a circumferential groove 706, A wire 708 is attached to the disc 705 at point 709 and wound one or more times around the disc 705, along the groove 706. Wire 708 exits the disc 705 at point 710 as shown in FIG. 7.

Motor 711 attached to the rod 704, can rotate the rod 704 is a to-fro motion.

There is similar set of objects: 702*a*, 703*a*, 704*a*, 705*a* etc. on the right side of the machine.

Motors 711 and 711*a* rotates the rod 704 and 704*a* to-and-fro resulting in an oscillating "sawing" action motion in the cutting wire along its length.

There can be multiple disc-wire sets on the rod 704, resulting in a multi-string cutting system.

A dedicated computer-controlled motion system can grab the discs 705 and slide them along the rod 704, in a programmed sequence, to achieve the required string pitch.

The rod 703 is free to rotate by the end support bearing, thus it can freely rotate, thus avoiding rubbing between wire 701 and rod 703.

In another embodiment, the rod 703 is controlled by a motor 504. Motors 711 & 504 works in a synchronized way (electronically or mechanically coupled), avoiding rubbing of the wire 701 in the rod 703.

There can be an optional insulating plate between spring 702 and wire 701.

Existing systems in prior art vibrate the entire frame consisting of 703, 703A, 704, 704A etc. resulting in lot of vibrations and need of a very heavy-duty actuator. All that is avoided in this new design.

Figure 8:
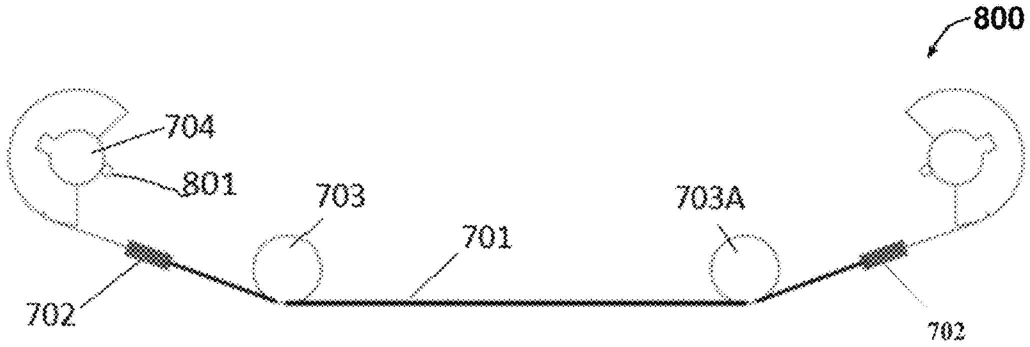
FIG. 8 shows a system for adjusting both string pitch adjustment, as well as wire oscillation, with supporting idler rollers.

FIG. 8 shows an optional support rod 801, to support the splined shaft or rod 704 along its length. Turned on, the rod is rotated by 180 deg to engage the strings to the groove.

Figure 9:
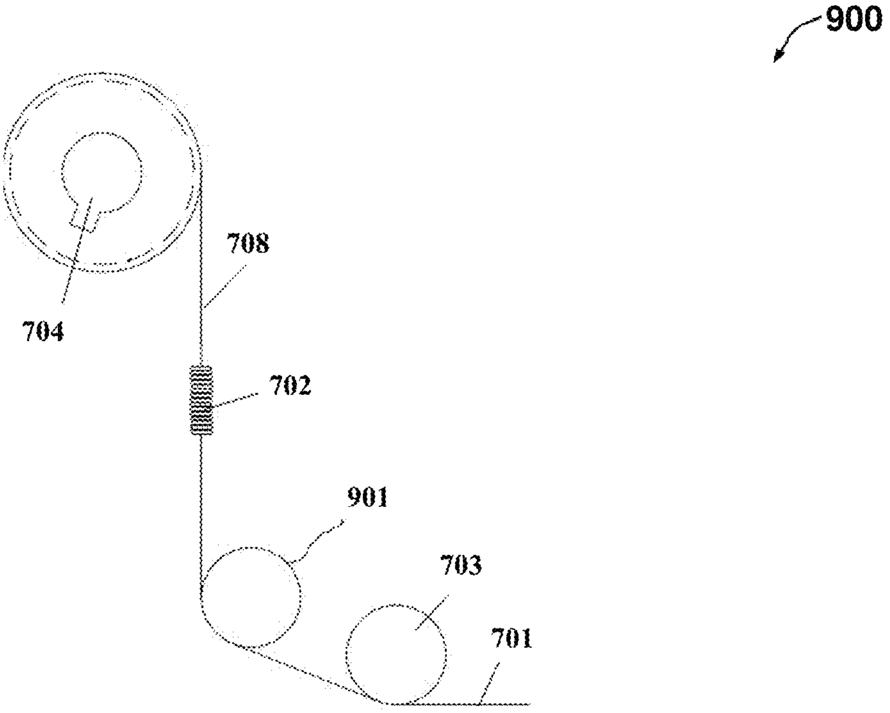
FIG. 9 shows a system for adjusting both string pitch adjustment, as well as wire oscillation, with longer strokes.

FIG. 9 shows an optional idler pulley 901, which allows the springs 702 and wire 708 to be at almost 90 degrees to cutting wire 701. This allows us to use a longer string 708, allowing longer oscillation stroke length without increasing the width of the machine.

Carbon brush, slip rings can be used to power the rod 703, allowing it to rotate higher angles.

Disc 705 and rod 703 can be same diameter or different diameter.

The rods 704,704*a* can be optionally rotated by single motor, so there is perfect synchronization.

Figure 11:
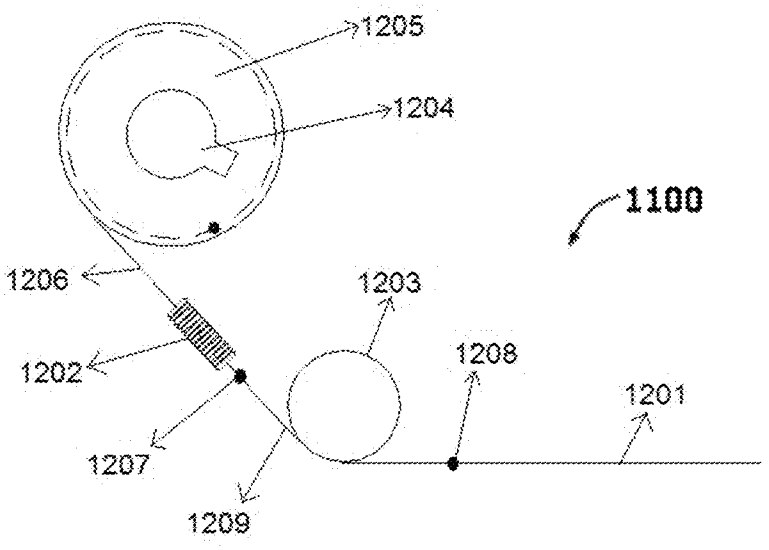
FIG. 11 shows the proposed Oscillating hotwire with composite wire.

Referring to FIG. 11, during this wire oscillation, wire 1201 tends to go through multiple bending un-bending cycles, causing wire breakage due to fatigue loads. In this invention it is proposed to use a multi-strand braided high strength wire 1209 between pointA (1207) and pointB (1208) as shown in FIG. 11. After pointB, regular heating wire (NiCr, Tungsten etc.) is used.

Figure 12:
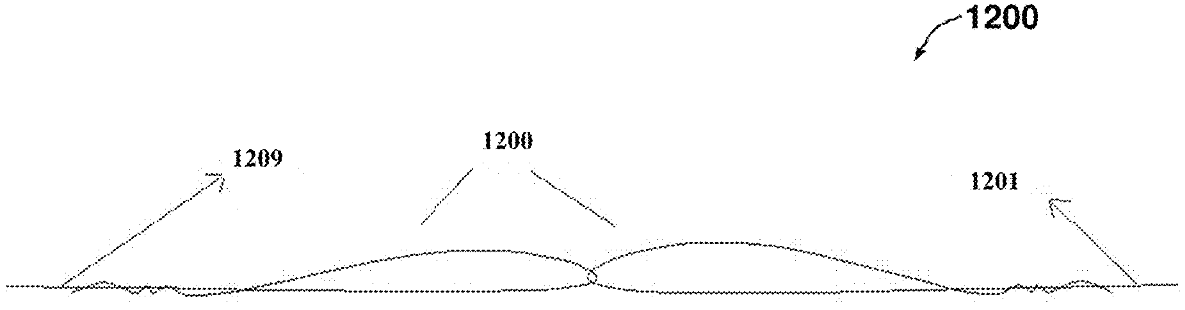
FIG. 12 shows the proposed joining method of Oscillating hotwire with composite wire.

At pointB (1208), the ends of the wire 1209 and 1201 are looped and joined, as shown in FIG. 12. Such a loop connection is easily achieved manually by the operator, in case of wire breakage. Or there can be a circular loop crimped to end of wire 109.

Optionally wire 1209 and 1201 can be TIG/LASER welded.

Also, material of wire 1209 is chosen to have low electrical resistance and good conductivity, such that it will not heat up, thus maintaining high mechanical strength at all times.

Grooved rod 1203 can optionally be clad with a higher pitch grooved/threaded rod, so that a thicker wire 1209 can be used.

This invention is also applicable to cutting of any other material using one or more wires with oscillation, with auto-string pitch adjustment mechanism.

Specifically This invention is also applicable to cutting of any metal using one or more wires with oscillation, with auto-string pitch adjustment mechanism, using EDM method of material removal.

Figure 10:
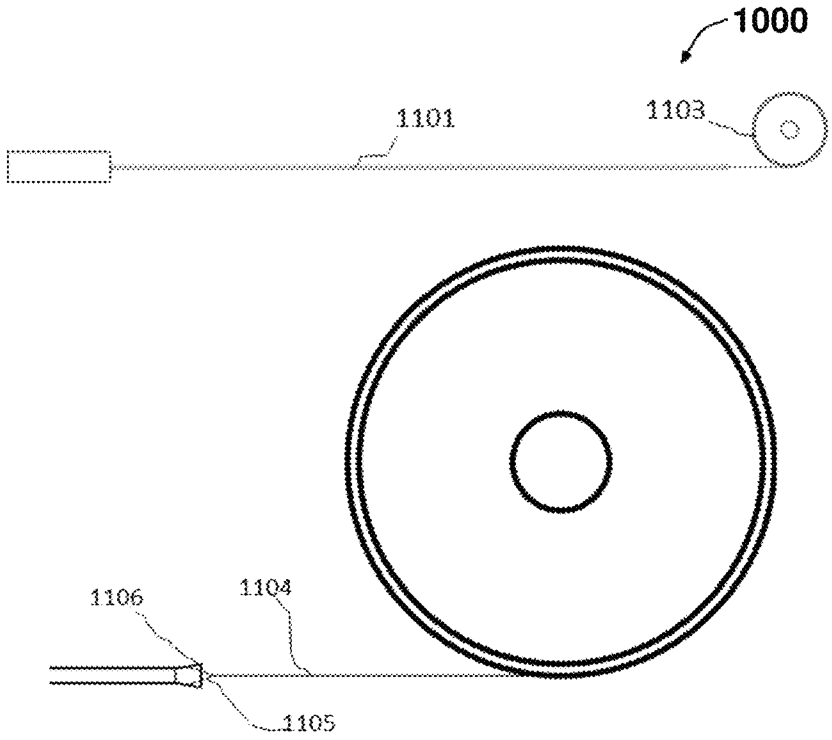
FIG. 10 shows a Block piercing and cutting system using Long Hot Knife.

FIG. 10 shows a Tip heating Long Hot Knife (LHK) 1101 with a loop 1102 at its tip or crimped triangular shape 1106 at its tip. There is a coil of wire 1103 on other end of the block. Heating wire 1104 from the coil 1103, has a loop 1105 at its end. The loop 1105 latches to the loop 1102 or tip 1106 of the knife 1101. When knife 1101 retracts, it carries the wire 1104 with it to the other end of the block. Now cutting can happen with wire 1104 and cutting can be started from middle of the block, after introducing wire tension using springs using standard mechanism.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A hotwire cutting machine (700), comprising:

a single or plurality of heated wires (701 and 101);

a plurality of springs (702 and 702*a*);

a plurality of grooved rods (703, 703*a*, and 1203) supported by end bearings (402 and 403);

secondary bearings (404 and 405) at a middle of the grooved rods (703, 703*a*, and 1203), wherein the plurality of grooved rods (703, 703*a*, and 1203) are coupled to a synchronized motor (504) for rotating each grooved rods (703, 703*a*, and 1203) of the plurality of grooved rods (703, 703*a*, and 1203) in a direction of the single or plurality of heated wires (701 and 101) movement due to thermal expansion effects and reduce friction between the single or plurality of heated wires (701 and 101) and the plurality of grooved rods (703, 703*a*, and 1203);

a splined shaft pair (704, 704*a*, and 1204) on which a plurality of discs (705 and 705*a*), slide holding the single or plurality of heated wire (701 and 101) via a plurality of non-heated wires (708, 708A); and a motors (711, 711*a*) capable of providing a to-fro oscillating sawing motion action to all the single or plurality of heated wires (701 and 101) by to-fro rotation of the splined shaft pair (704, 704*a*, and 1204) to achieve faster cutting speeds, wherein the plurality of grooved rods (703, 703*a*, and 1203) are free to rotate with help of end bearings (402 and 403) and secondary bearings to avoid rubbing between single or plurality of heated wires (701 and 101) and the plurality of grooved rods (703, 703*a*, and 1203).

2. The hotwire cutting machine (700) of claim 1, wherein the synchronized motor (504) is attached to each of to the plurality of grooved rods (703, 703*a*, and 1203) and synchronized with the motors (711, 711*a*) that attached to the splined shaft pair (704, 704*a*, and 1204), to avoid the relative motion between the single or plurality of heated wires (701 and 101) and the plurality of grooved rods (703, 703*a*, and 1203).

3. The hotwire cutting machine (700) of claim 1, wherein the plurality of grooved rods (703, 703*a*, and 1203) has grooves on one cylindrical portion along its circumference and another portion being plain without grooves.

4. The hotwire cutting machine (700) of claim 1, wherein the grooved rods (703, 703*a*, and 1203) have straight fine pitch grooves.

5. The hotwire cutting machine (700) as claimed in claim 1 wherein the plurality of grooved rods (703, 703*a*, and 1203) can be a threaded or grooved rod (601) with semi-circular sheet cladding (602).

6. The hotwire cutting machine (700) of claim 1, wherein the plurality of discs (705 and 705*a*) are configured to be grabbed by a separate programmable CNC system and moved along the splined shaft pair (704, 704*a*, and 1204) and positioned to position the single or plurality of heated wires (701 and 101) at desired pitch position, for multi-wire cutting.

7. The hotwire cutting machine (700) of claim 1, wherein the splined shaft pair (704, 704*a*, and 1204) is supported by a plurality of idler shafts or rollers (801), preventing the splined shaft pair (704, 704*a*, and 1204) from bending due to forces from the plurality of springs (702, 702*a*).

8. The hotwire cutting machine (700) of claim 1, wherein the splined shaft pair (704, 704*a*, and 1204) and the plurality of grooved rods (703, 703*a*, and 1203) are configured with an idler shaft (901) allowing the plurality of springs (702 and 702*a*) to be at 90 deg to the single or plurality of heated wires (701 and 101).

9. The hotwire cutting machine (700) of claim 1, wherein the single or plurality of heated wires (701 and 101) are composite cutting wire (1200) comprising a first wire (1209) joined to both ends of a second heated wire (1201), wherein the first wire (1209) and the second heated wire (1201) are joined by manual twisting or welding and the first wire (1209) having higher mechanical strength compared to the second heated wire (1201) and hence capable of withstanding repeated bending cycles moving over the plurality of grooved rods (703, 703*a*, and 1203) and oscillated along its length by the to-fro rotation of the splined shaft pair (704, 704*a*, and 1204).

* * * * *